Wm. Tinker,
Mower.

No. 16,194.          Patented Dec. 9, 1856.

UNITED STATES PATENT OFFICE.

WM. TINKER, OF KELLOGGSVILLE, OHIO.

IMPROVEMENT IN HARVESTERS.

Specification forming part of Letters Patent No. 16,194, dated December 9, 1856.

*To all whom it may concern:*

Be it known that I, WILLIAM TINKER, of Kelloggsville, in the county of Ashtabula and State of Ohio, have invented a new and useful Improvement in Grain and Grass Harvesters; and I do hereby declare that the following is a full, clear, and exact description of the same, reference being had to the annexed drawings, making a part of this specification, in which—

Figure 1:
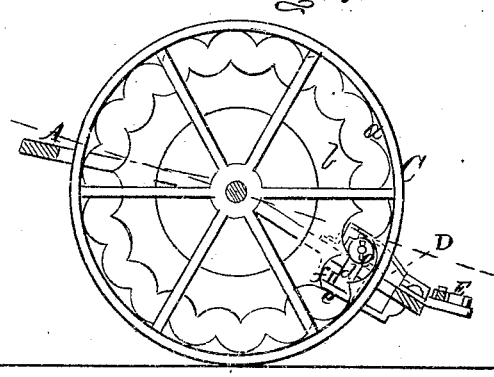
Figure 2:
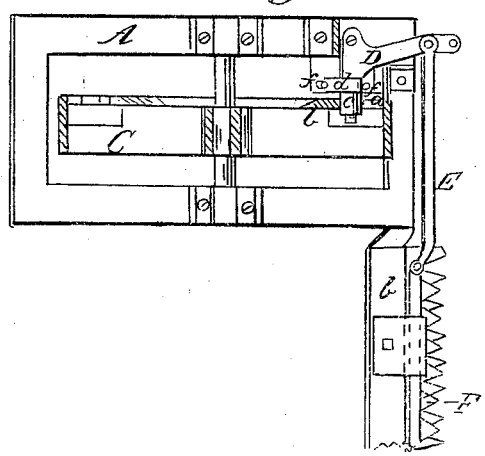

Figure 1 is an inner side view of the main frame of a reaper with my improvement applied to it. Fig. 2 is a section of the same, $x\ x$, Fig. 1, showing the plane of section.

Similar letters of reference indicate corresponding parts in the two figures.

A represents the main frame of a harvester. This frame is of square form and slightly bent at its center, and has the finger-bar B attached to its front part.

C is the driving-wheel, which is secured within the frame A. The outer edge of the tread of the wheel C has a scalloped rim, $a$, attached to it, and a scalloped ring, $b$, is attached to the outer side of the wheel C, the centers of the concaves or scallops of the ring $b$ being opposite the points of the scallops on the rim $a$, as clearly shown in Fig. 1.

D represents a bent or elbow lever, which is pivoted to the main frame A. The inner end of this lever has a friction-roller, $c$, upon it, which roller fits and works between the rim $a$ and ring $b$. The outer end of this lever is connected by a pitman, E, with the sickle F.

To the inner end of the lever D, near the friction-roller $c$, a support, $d$, is attached. This support is a small rod, through the upper end of which the lever D passes, the rod or support being loose thereon. The lower end of this rod or support rests upon a plate, $e$, attached to the under side of the main frame, the lower end of the rod being fitted between two studs, $f$, on the plate $e$, the studs keeping the rod or support in proper position.

From the above description of parts it will be seen that as the machine is drawn along the rim $a$ and ring $b$ will give a reciprocating motion to the sickle F, the length of the vibration of the sickle being regulated by attaching the pitman E nearer to or farther from the end of the lever D. The rod or support $d$ prevents the inner end of the lever D from being depressed by the action of the scalloped rim and ring upon it, while it allows the most perfect freedom of motion thereto, whereby said rim and ring are caused to produce but very little friction on the lever, and are but slightly hindered in their action thereby.

I do not claim driving or operating the sickle F by means of the bent lever D and the scalloped rim $a$ and ring $b$ on the driving-wheel, for this or equivalent devices have been previously used; but

What I claim as my invention, and desire to secure by Letters Patent, is—

The employment of the freely-turning support $d$, arranged and operating substantially as described, in combination with the bent lever D and scalloped driving-wheel C, for the purpose of securing said lever from strain, and at the same time of retaining the utmost facility and freedom of motion thereof, in the manner herein specified.

WM. TINKER.

Witnesses:
 ZAPHNE LAKE,
 CALEB WOODARD.